US 6,953,264 B2

(12) United States Patent
Ter-Hovhannisian

(10) Patent No.: US 6,953,264 B2
(45) Date of Patent: Oct. 11, 2005

(54) VEHICLE LIGHT ASSEMBLY

(75) Inventor: Artak Ter-Hovhannisian, Burbank, CA (US)

(73) Assignee: American Superlite, Inc., Sun Valley, CA (US)

( * ) Notice: Subject to any disclaimer, the term of this patent is extended or adjusted under 35 U.S.C. 154(b) by 0 days.

(21) Appl. No.: 10/394,091

(22) Filed: Mar. 20, 2003

(65) Prior Publication Data

US 2003/0156410 A1 Aug. 21, 2003

Related U.S. Application Data

(63) Continuation-in-part of application No. 09/991,515, filed on Nov. 16, 2001, now abandoned.

(60) Provisional application No. 60/250,940, filed on Dec. 2, 2000.

(51) Int. Cl.$^7$ .................................. F21V 7/09
(52) U.S. Cl. ............... 362/241; 362/518; 362/521; 362/545
(58) Field of Search ................ 362/241, 247, 362/245, 800, 516, 517, 518, 521, 235, 309, 362/545

(56) References Cited

U.S. PATENT DOCUMENTS

| 5,136,483 A | 8/1992 | Schoniger et al. |
| 5,580,156 A * | 12/1996 | Suzuki et al. ............... 362/184 |
| 6,367,949 B1 | 4/2002 | Pederson |
| 6,406,172 B1 | 6/2002 | Harbers et al. |
| 6,431,738 B1 * | 8/2002 | Kondo et al. ............... 362/517 |
| 6,499,870 B1 * | 12/2002 | Zwick et al. ............... 362/505 |
| 6,520,669 B1 | 2/2003 | Chen et al. |
| 6,550,950 B1 | 4/2003 | Fernandez |
| 6,565,247 B2 | 5/2003 | Thominet |
| 6,601,982 B1 | 8/2003 | Begemann et al. |
| 6,614,103 B1 * | 9/2003 | Durocher et al. ........... 257/678 |
| 6,654,172 B2 * | 11/2003 | Pond et al. ............... 359/619 |
| 2001/0019486 A1 | 9/2001 | Thominet |

* cited by examiner

Primary Examiner—Sandra O'Shea
Assistant Examiner—Guiyoung Lee
(74) Attorney, Agent, or Firm—Kelly Lowry & Kelley, LLP

(57) ABSTRACT

A vehicle light assembly includes a reflector having a plurality of depressions, each depression having interruptions on a reflective surface thereof to maximize reflection. One or more light emitting diodes are disposed within each depression so as to be generally surrounded by the depression. A lens is disposed over the reflector for allowing light to pass therethrough. The lens may include a plurality of domes, each dome disposable over a light emitting diode or cluster of light emitting diodes. Preferably, each dome includes a central dimple lens and spaced apart ridges encircling the central dimple lens which serve to direct light in a selected manner.

19 Claims, 4 Drawing Sheets

VEHICLE LIGHT ASSEMBLY

RELATED APPLICATION

This application is a continuation-in-part of U.S. application Ser. No. 09/991,515, filed Nov. 16, 2001 now abandoned, which claims priority from U.S. Provisional Application Ser. No. 60/250,940, filed Dec. 2, 2000.

BACKGROUND OF THE INVENTION

The present invention generally relates to lights and reflector assemblies. More particularly, the present invention relates to an LED and reflector assembly for use in clearance and safety lights for heavy duty vehicles, commercial trucks and truck trailers, boat trailers, busses, recreational vehicles and other vehicles.

Vehicle warning and safety light assemblies are typically equipped with conventional filament light bulbs which have a number of well-known problems. For example, the light bulbs draw excessive current. Under certain conditions are not bright enough to see from a trailing vehicle. Moreover, traditional light bulbs have a relatively short life span, requiring frequent replacement. Failure to replace such light bulbs promptly can create an unsafe vehicle condition, and possible injury not only to those within the vehicle but also to persons in other vehicles as well.

Light emitting diodes (LED's) have recently been developed for use as a light source in motor vehicle light assemblies. An advantage to using LED's is that they typically have an operating life of as much as 100,000 hours before they begin to degrade. LED's also draw less current from the vehicle's electrical system and emit more light than similarly configured or styled filament light bulbs. LED lighting assemblies have also been found to have better visibility in fog and bad weather and reduce the reaction time during braking. The light emitted from the LED is sharper, brighter and has better visibility from a distance.

However, existing LED light assemblies have been found to have certain disadvantages. The light produced by LED's is a directional light, like a laser beam, with a given specific angle. Currently, LED's are clustered tightly together to achieve a uniform light. These cluster assemblies aggregate the LED's in a position which allows the assembly to pass Department of Transportation light output requirements when viewed from a "top" angle. These assemblies use flat lens or covers which affects the viewing angle. If the viewing angle is changed or the LED is improperly positioned, insufficient light is emitted. Such LED assemblies are covered with a lens, typically red or amber in color. In some models, there is no use of optics whatsoever and the lens is merely a cover for protection.

Such LED clusters have been found to be expensive to produce due to the high number of LED's required. Also, the high number of LED's create an enormous amount of heat which prematurely degrades the life span of such assemblies. To date, there has been no use of reflectors or reflective surfaces to enhance the light output of LED assemblies due to the fact that the train of thought in the industry is that the use of reflectors or reflective surfaces is impractical or ineffective due to the directional light emitted from the LED.

Accordingly, what is needed is an LED assembly which requires fewer LED's. What is also needed is an LED assembly which incorporates an effective reflector to enhance the light output of the assembly. The present invention fulfills these needs and provides other related advantages.

SUMMARY OF THE INVENTION

The present invention resides in a vehicle light assembly which is configured to allow the use of only a few LED's in each light assembly.

The light assembly of the present invention generally comprises at least one light emitting diode, and preferably an array of multiple light emitting diodes or clusters of light emitting diodes. A reflector is positioned relative to the light emitting diodes so as to reflect light emitted therefrom. The reflector includes depressions surrounding each light emitting diode, or cluster of light emitting diodes of the array. A lens is disposed over the reflector to allow light to pass therethrough. The lens may be transparent and the light emitting diodes colored, such as red or amber.

Typically, the depressions are generally conical in configuration so as to substantially surround each light emitting diode or cluster of light emitting diodes and has a width which is less than the angle of illumination of the light emitting diode or cluster of light emitting diodes to maximize reflection. Of particular importance to the invention is that the reflective surface of the depressions of the reflector include interruptions to maximize the reflective surface of the reflector. Such interruptions may comprise a plurality of protrusions, such as hemispherical bumps or serrations, arranged to maximize the reflector surface of the reflector. Alternatively, the interruptions may comprise a plurality of dimples or recessions formed in the surface of the depression, or a combination thereof.

The light emitting diode may be disposed over the depression, but in a particularly preferred embodiment, the light emitting diode, or cluster of diodes, is disposed within the depression by extending through an aperture formed in a lower end thereof.

The lens preferably includes a plurality of domes for reflecting at least a portion of the light emitted from the light emitting diodes to the reflector so as to disperse the light. Each dome includes a central dimple lens and ridges spaced from one another and encircling the central dimple lens in a concentric fashion for directing the light onto the reflector.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
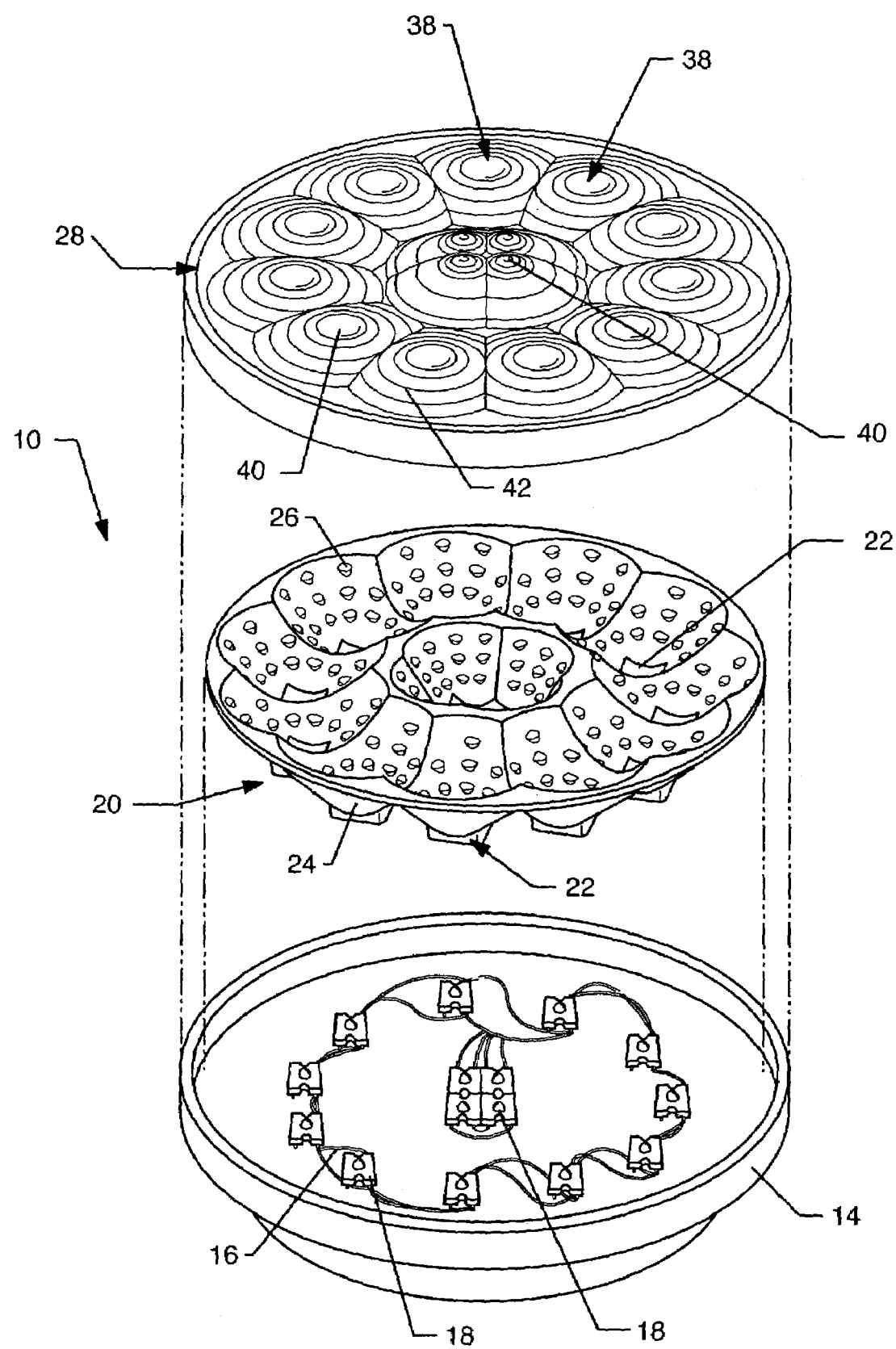
FIG. 1 is a exploded perspective view of a vehicle light assembly embodying the present invention.
Figure 2:
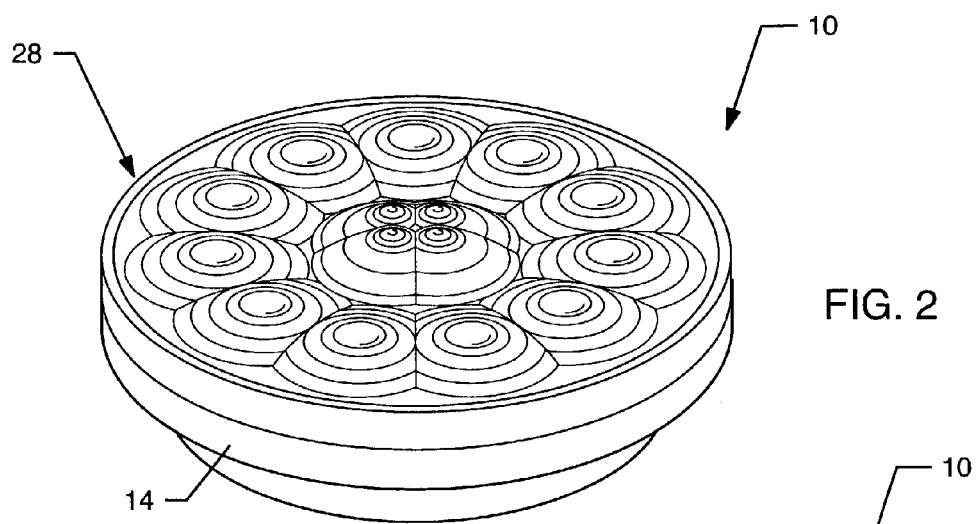
FIG. 2 is a perspective view of the assembly of FIG. 1 in an assembled state.
Figure 3:
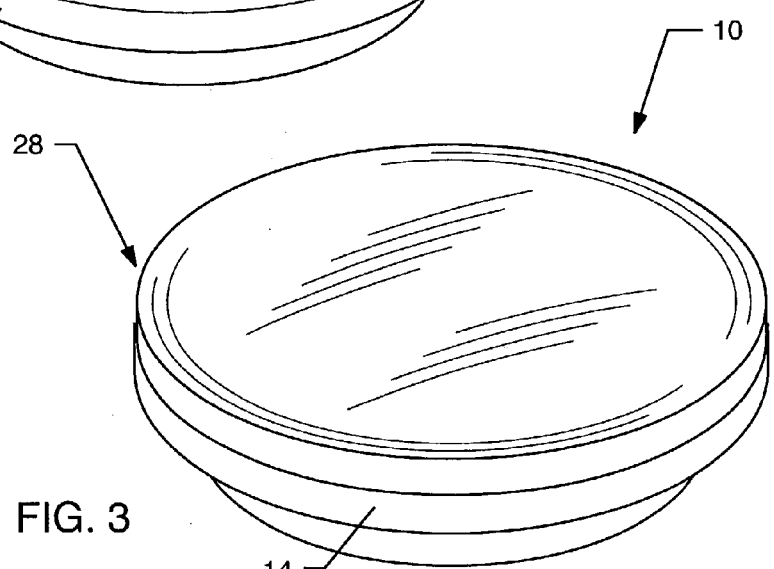
FIG. 3 is a perspective view of a vehicle light assembly embodying the present invention, and having a flat lens.
Figure 4:
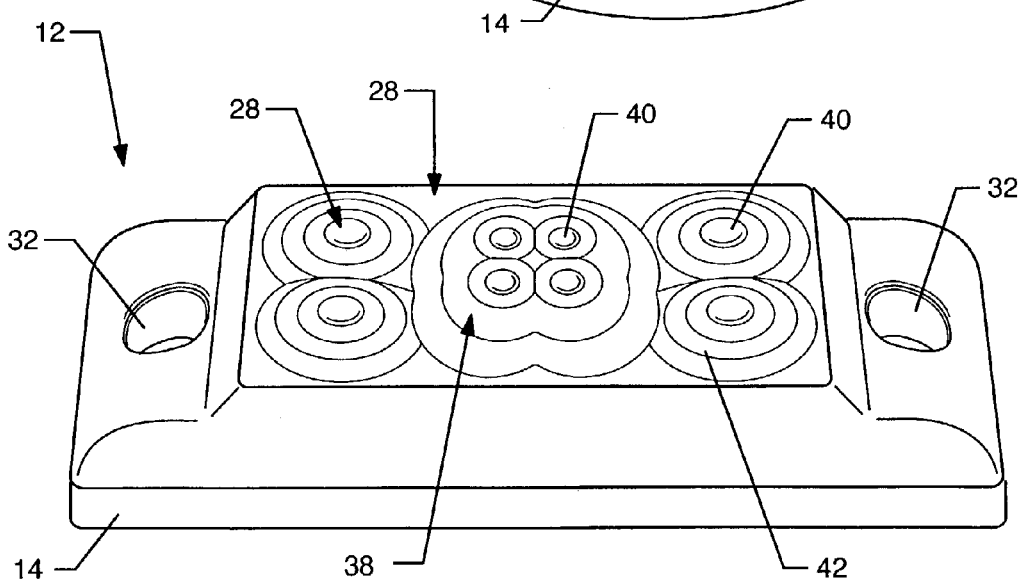
FIG. 4 is a perspective view of another vehicle light assembly embodying the present invention.
Figure 5:
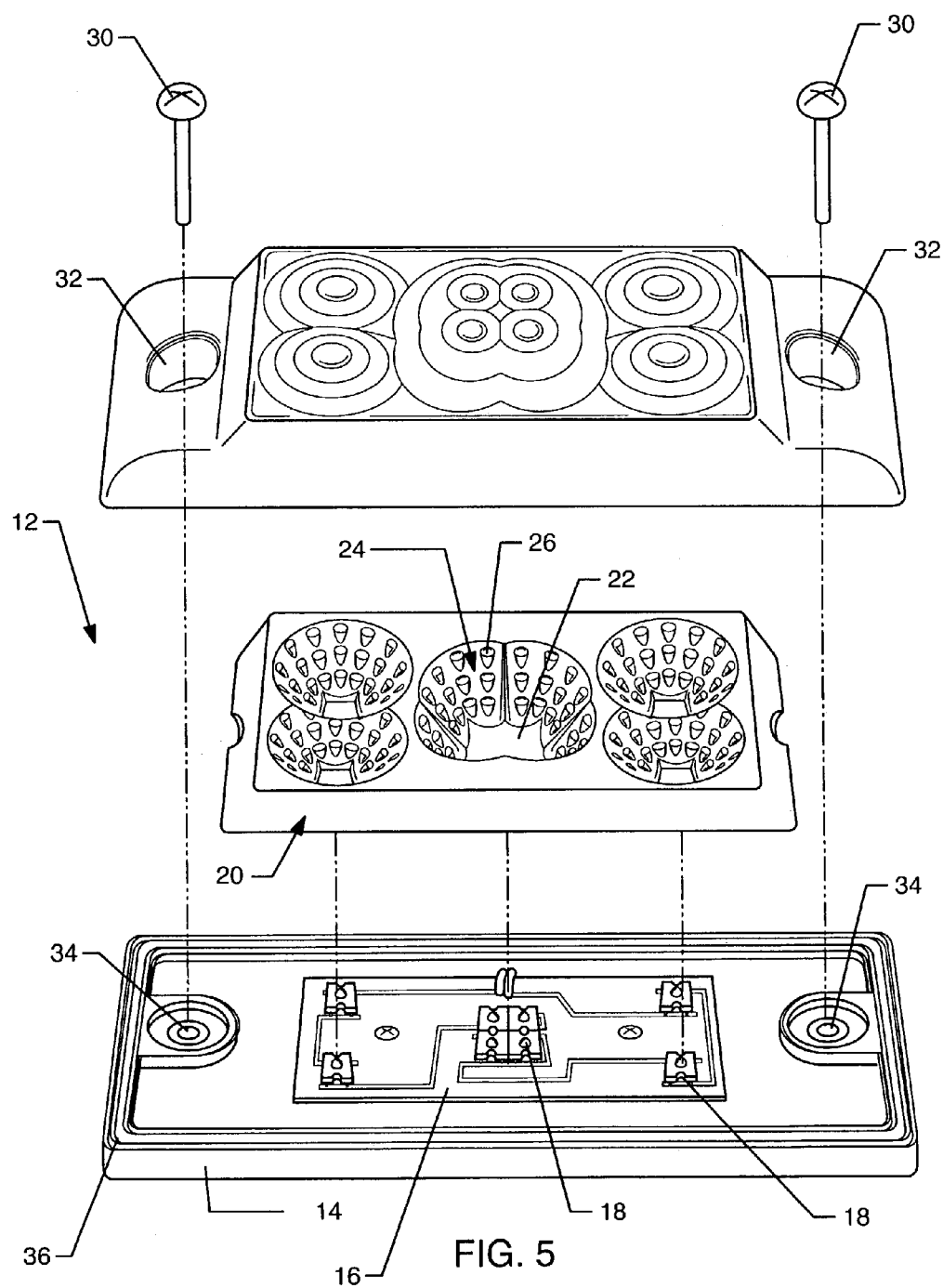
FIG. 5 is an exploded perspective view of the assembly of FIG. 4.
Figure 6:
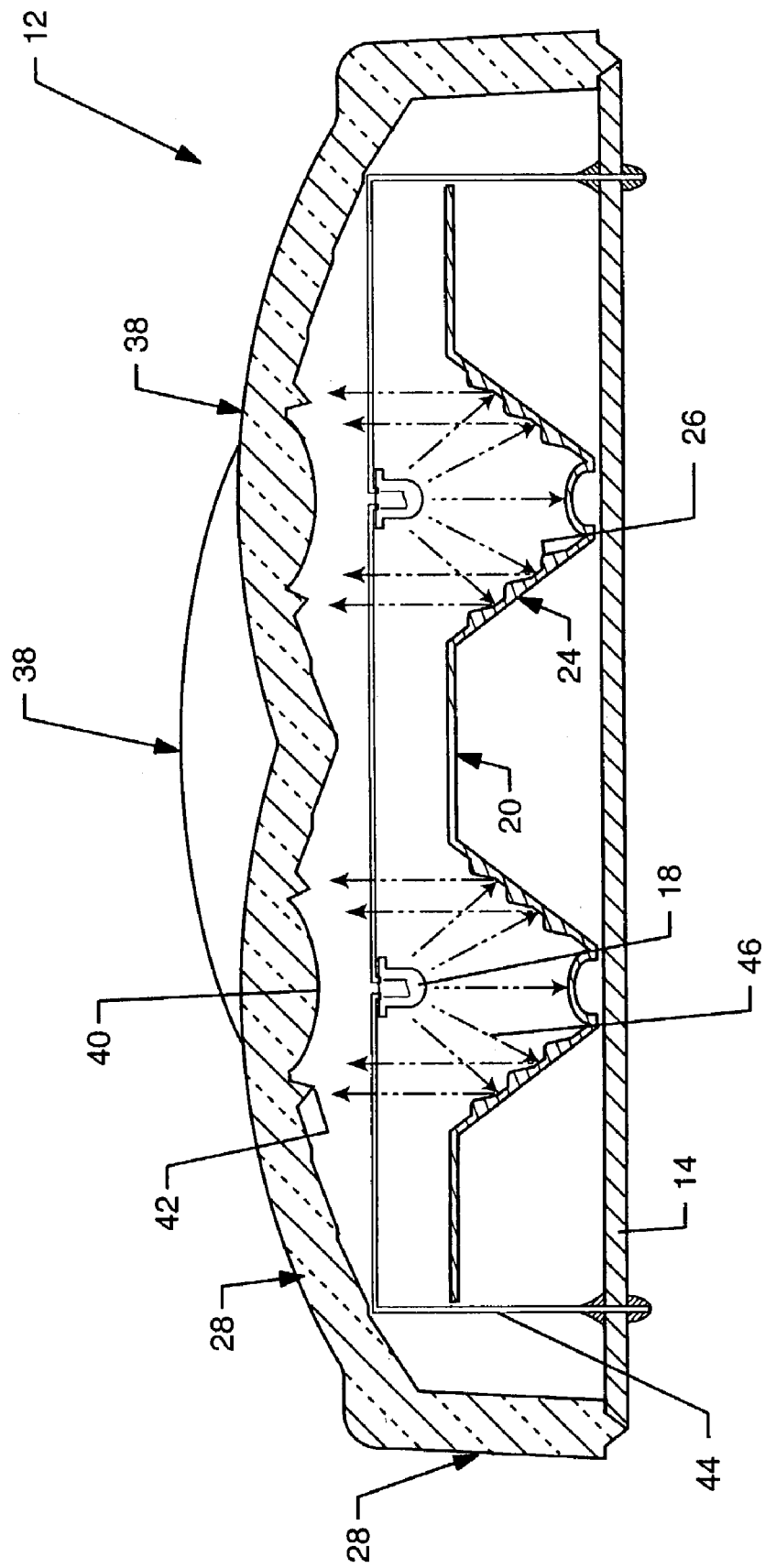
FIG. 6 is a cross-sectional view of a light assembly similar to FIG. 5, illustrating light emitting diodes disposed over depressions of a reflector of the assembly, and illustrating a preferred configuration of the lens.

As illustrated in the accompanying drawings for purpose of illustration, the present invention resides in an automobile reflector assembly referred to by the reference number 10 in FIGS. 1–3, and by the reference number 12 in FIGS. 4–6. The design of the present invention is so effective that in some models, the number of LED's required for each assembly is only one quarter of those required in existing LED cluster models.

With reference to FIGS. 1 and 2, a first automobile reflector assembly 10 embodying the present invention is shown. The assembly 10 includes a base 14 in which rests a circuit board 16 having a plurality of LED's 18. The base 14 may be filled with an epoxy that holds the circuit board 16 in place, and serves to direct heat away from the LED's 18. Due to the low number of the LED's 18, neither a heat sink nor such epoxy has been found to be necessary, however. It will be noted that the LED's 18 are not aggregated in a cluster, but rather spread across the surface of the circuit board 16. The number of LED's 18 in each grouping depends upon the nature of the lighting assembly 10, as larger assemblies and those which require more light emission will include more LED's 18, whereas smaller assemblies will require less. Regardless, the number of LED's 18 required for the present invention is substantially less than that used in current models.

A reflector 20 is disposed over the LED's 18. The reflector 20 includes a plurality of apertures 22 which are sized to accept each LED 18, or grouping of LED's 18, therethrough so that the LED's 18 are disposed adjacent to reflective surfaces of the reflector 20. The reflector 20 is configured such that a depression 24 surrounds each light LED or cluster of LED's 18. Preferably, each depression 24 has a width, or angle, selected to be less than an angle of illumination of the LED or cluster of LED's 18 so light reflection and dispersion is facilitated. Typically, as illustrated, each depression 24 is generally conical in configuration.

The inner reflective surface of these conical depressions 24 have interruptions 26, so as to form a non-uniform reflective surface. Each conical depression 24 may include a plurality of protrusions 26, illustrated as hemispherical bumps, which are arranged to maximize the reflective surface of the reflector 20. Although the depressions 24 are illustrated as being generally conical, it will be understood by those skilled in the art that the depressions can have other configurations as well. Additionally, the interruptions 26 need not be hemi-spherical bumps, but can be serrations, or even indentations or recesses, such as dimples. The important aspect of the present invention is that the depressions 24 have such interruptions 26 so as to maximize the reflective surface thereof.

A lens 28 is disposed over the reflector 20 and light emitting diodes 18, and attaches to the base 14 so as to house the circuit board 16, LED's 18 and reflector 20. The lens 28 can be fixed to the base 14, such as by adhesives or the like. As shown in FIGS. 4 and 5, bolts 30 may extend through apertures 32 and 34 of the lens 28 and base 14, respectively, and into corresponding apertures of the vehicle to hold the assembly 10 in place on the vehicle. A gasket 36 can be placed between the lens 28 and base 14 to prevent water and other corrosive materials from entering into the assembly 10, as illustrated in FIG. 5.

The lens 28 is preferably comprised of ultraviolet stabilized Lexan or other appropriate glass or plastic material. The lens 28 may be of a standard and flat construction, as illustrated in FIG. 3. However, the lens 28 in a particularly preferred embodiment includes multiple dome-like bubbles 38 which overlie each conical depression 24 and LED 18 or grouping of LED's 18.

Each dome 38 includes a central dimple lens 40, or several dimples lenses 40 corresponding to each LED 18. For example, the lens 28 illustrated in FIG. 1 includes a large central dome 38 having four dimple lenses 40 corresponding with the grouping of four LED's 18 disposed in the central conical depression 24. The surrounding domes 38 only include one central dimple lens 40 each, which corresponds with a single LED 18 positioned thereunder.

With reference now to FIG. 6, a cross-sectional view of the domed lens 28 is shown. As can be seen from this illustration, the domes 38 arch above the otherwise planar surface of the lens 28. Each central dimple lens 40 extends downwardly into the assembly 10. Each dome 38 includes ridges 42 which encircle each dimple lens 40 in a concentric fashion so that each ridge 42 is spaced from the adjoining ridge. The dimple lens 40 and ridges 42 are intended to reflect the light emanating from the LED back into the assembly 10 or 12 and onto the reflector 20. The interruptions 26 on the surface of the depressions 24 redirect the reflected light back through the lens 28 so as to simulate the look of multiple LED's 18 and effectively disperse the light. This results in the lens 28 effectively glowing due to the redirected, reflected, and dispersed LED light. Thus, very few LED's 18 are required to illuminate the lens 28.

Another advantage of the dome configuration of the lens 28 is that it significantly increases the overall strength of the lens 28 so that it resists breakage. Such breakage typically occurs in conventional automobile lights when the automobile strikes another object, such as another car, or loose objects on the road strike the lenses. As can be appreciated by the reader, this significantly impacts the safety of the vehicle.

The Department of Transportation regulations that were written in the 1970's, and updated in the 1980's, to require that the color of light emanating from such tail, clearance marker, or automobile signal lights be red or amber depending on the light. The present invention contemplates using LED's 18 which emit red, such as for tail lights, or amber, for side marker lights. The lens 28 can thus be clear. While this may desirable for cosmetic purposes, it also serves as a safety feature. For example, if the battery goes dead and the lights are inoperable, light from a trailing vehicle will enter and exit through the clear lens and be reflected from the reflector of the assembly 10 much easier than through a red or amber lens.

Although the LED's 18 have been described as extending upwardly through apertures 22 formed in the depressions 24 of the reflector 20, the LED's 18 can also be positioned above the reflector 20, and directed downwardly towards the depression 24, as illustrated in FIG. 6. An electrical lead 44, or support, would position the LED's 18 over the depressions 24 such that light 46 emitted from the LED's 18 would hit the reflective surface, and interruptions 26 of the depression 24 of the reflector 20 and be directed upwardly towards the lens 28. As described above, the interruptions 26, as well as the configuration of the domed lens 28, will cause the light 46 to be dispersed, or concentrated, as desired in order that the proper emission of light from the assembly 10 or 12 will be realized. Although dispersion of the light is created, causing the lens 28 to glow, Department of Transportation regulations also require that the light be focused at certain points, particularly at the center of the lens 28. Accordingly, a cluster of LED's 18 is often formed in the middle of the assembly 10 or 12, and the enlarged dome 38 present with dimple lenses 40 causing the concentration of light at these points.

The present invention provides many advantages over existing LED cluster lighting assemblies. The assemblies 10 and 12 of the present invention are considerably less expensive than existing assemblies due to the fact that fewer LED's are required. Although the assemblies 10 and 12 use fewer LED's, there is an overall increase in the amount of uniform light emitted from the assembly 10 or 12 due to the use of the reflector 20 and the dome-like lens 28. The reflector 20 and lens 28 also increase the viewing angle of the light from the assembly 10 or 12, such that visibility is seen from a side angle of the assembly 10 or 12, and not only at a direct angle of the assembly.

Although several embodiments have been described in detail for purposes of illustration, various modifications may be made without departing from the scope and spirit of the invention. Accordingly, the invention is not to be limited except as by the appended claims.

What is claimed is:

1. A vehicle light assembly, comprising:
    a light emitting diode;
    a reflector positioned relative to the light emitting diode so as to reflect light emitted therefrom, the reflector including a depression substantially surrounding the light emitting diode and having a reflective surface which includes interruptions, wherein the interruptions includes a plurality of protrusions extending from the surface of the depression, or a plurality of dimples or recessions formed in the surface of the depression; and
    a lens disposed over the reflector for allowing light to pass therethrough.

2. The assembly of claim 1, wherein the light emitting diode comprises an array of multiple light emitting diodes or clusters of light emitting diodes.

3. The assembly of claim 2, wherein the reflector includes a plurality of depressions surrounding each light emitting diode or cluster of light emitting diodes of the array.

4. The assembly of claim 3, wherein the depressions are generally conical and have a width selected to be less than an angle of illumination of the light emitting diode or cluster of light emitting diodes.

5. The assembly of claim 2, wherein the lens includes a plurality of domes, each dome disposable over a light emitting diode or cluster of light emitting diodes for reflecting at least a portion of light emitting from the light emitting diodes onto the reflector so as to disperse the light.

6. The assembly of claim 5, wherein the domes each include a central dimple lens for directing the light onto the reflector.

7. The assembly of claim 6, wherein the domes each include ridges spaced from one another and encircling the central dimple lens.

8. The assembly of claim 1, wherein the protrusions comprise hemi-spherical bumps arranged to maximize a reflective surface of the reflector.

9. The assembly of claim 1, wherein the protrusions comprise a plurality of serrations extending from the surface of the depression.

10. The assembly of claim 1, wherein the light emitting diode is disposed within the depression.

11. The assembly of claim 10, wherein the light emitting diode extends through an aperture formed in a lower end of the depression.

12. The assembly of claim 1, wherein the light emitting diode is disposed over the depression.

13. The assembly of claim 1, wherein the lens is transparent and the light emitting diode emits red or amber light.

14. A vehicle light assembly, comprising:
    a reflector including a plurality of depressions, each depression having interruptions on a reflective surface thereof, wherein the interruptions includes a plurality of protrusions extending from the surface of the depression, or a plurality of dimples or recessions formed in the surface of the depression;
    an array of multiple light emitting diodes or clusters of light emitting diodes, the light emitting diode or cluster of light emitting diodes extending through an aperture formed in each depression so as to be generally surrounded by the depression; and
    a lens disposed over the reflector for allowing light to pass therethrough.

15. The assembly of claim 14, wherein the depressions are generally conical and have a width selected to be less than an angle of illumination of the light emitting diode or cluster of light emitting diodes.

16. The assembly of claim 14, wherein the lens includes a plurality of domes, each dome disposable over a light emitting diode or cluster of light emitting diodes for reflecting at least a portion of light emitting from the light emitting diodes onto the reflector so as to disperse the light.

17. The assembly of claim 16, wherein the domes each include a central dimple lens for directing the light onto the reflector, and ridges spaced from one another and encircling the central dimple lens.

18. A vehicle light assembly, comprising:
    a reflector including a plurality of generally conical depressions, each conical depression having interruptions on a reflective surface thereof, wherein the interruptions includes a plurality of protrusions extending from the surface of the depression, or a plurality of dimples or recessions formed in the surface of the depression;
    a plurality of light emitting diodes disposed within the conical depressions of the reflector; and
    a lens disposed over the reflector and light emitting diodes, the lens including a plurality of domes, each dome overlying a conical depression of the reflector for reflecting at least a portion of light emitting from the light emitting diodes onto the reflector so as to disperse the light.

19. The assembly of claim 18, wherein the domes each include a central dimple lens for directing the light onto the reflector, and ridges spaced from one another and encircling the central dimple lens.

* * * * *